July 19, 1960 A. W. VANCE ET AL 2,945,626
QUARTER-SQUARE MULTIPLIER
Filed Jan. 28, 1950

Inventors
ARTHUR W. VANCE &
EDWIN A. GOLDBERG
By Morris L. Rauer
Attorney

2,945,626

QUARTER-SQUARE MULTIPLIER

Arthur W. Vance, Union Valley, and Edwin A. Goldberg, Princeton Junction, N.J., assignors, by mesne assignments, to the United States of America as represented by the Secretary of the Navy Filed Jan. 28, 1950, Ser. No. 141,037

6 Claims. (Cl. 235—194)

This invention relates generally to electrical computers and particularly to a system for obtaining the product of two voltages.

It is an object of this invention to provide a novel and improved method of and means for multiplying two voltages to provide a resultant proportional to the product thereof.

It is still another object of this invention to provide a simple and accurate system for obtaining the product of two voltages.

These and other objects are achieved in accordance with this invention by providing a pair of parallel, spaced, fixed conductive plates and a parallel, movable plate positioned intermediate the fixed plates. The two voltages, whose product is desired to be obtained, are added and their sum is applied to one of the pair of plates and the movable plate. The two voltages are also subtracted and their difference is applied to the other of the pair of plates and the movable plate. The movable plate is moved by a net electrostatic force which is proportional to the product of the two voltages. Means are provided to apply a restoring force to the movable plate. This restoring force is equal and opposite to the net force and is applied by using a magnetic field transverse to the movable plate and passing a current through the plate to restore it. A measurement of the current amplitude required to restore the plate provides a resultant which is proportional to the product of the two voltages.

The novel features of the invention, as well as the invention itself, both as to its organiaztion and operation will best be understood from the following description when read in connection with the drawings, in which.

Figure 1:
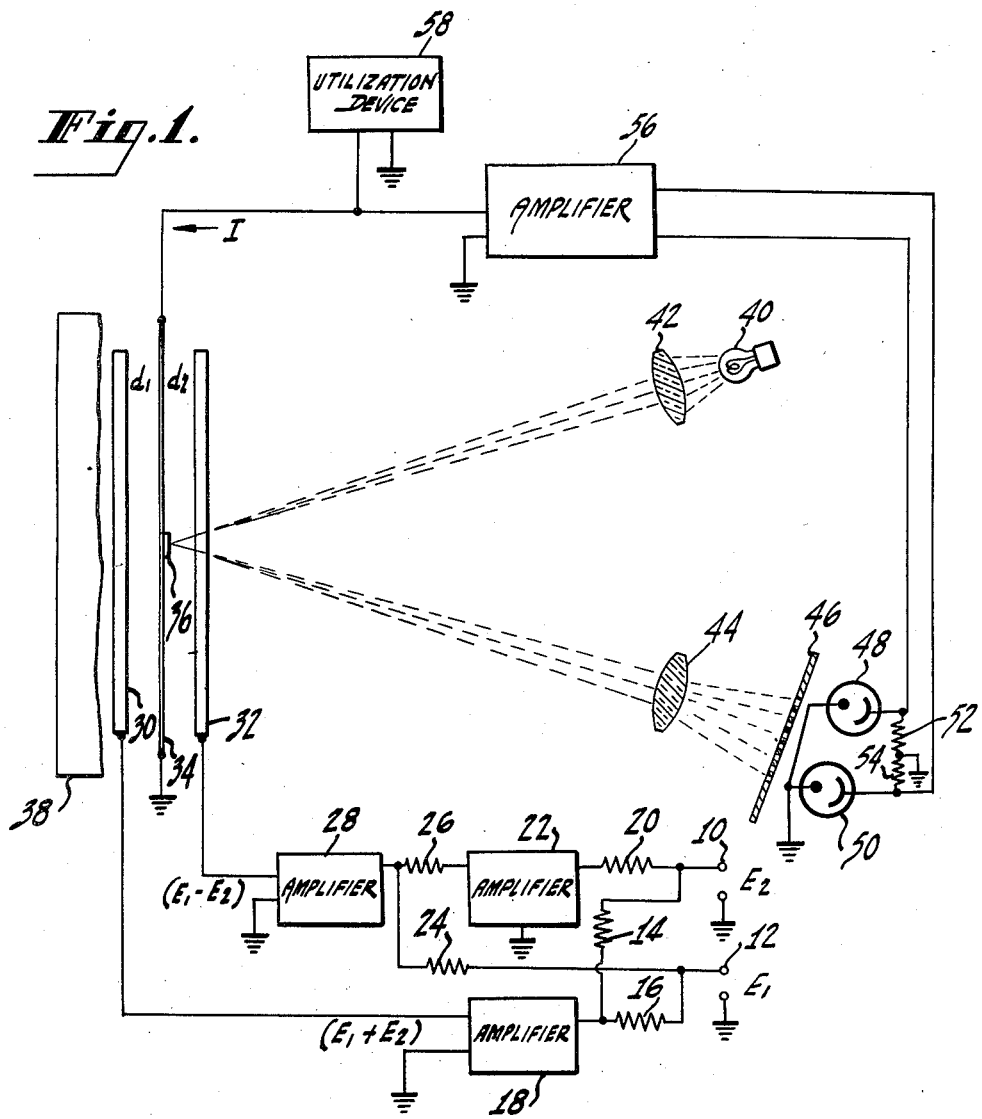
Fig. 1 is a schematic diagram of a preferred embodiment of the invention.

Referring to Figure 1, two voltages $E_1$ and $E_2$, whose product it is desired to obtain, are respectively applied to the two sets of terminals 10, 12 of the apparatus. Two summing resistors 14, 16 are connected from one set of the terminals 10 to the input of a summing type amplifier 18. There is therefore applied to the input of this amplifier 18 the sum of the two voltages $E_1$ and $E_2$. The summing type amplifier 18 is one having unity gain and is used for the purpose of isolation. Its output therefore is the sum of $E_1$ and $E_2$.

The voltage $E_2$ is applied through a resistor 20 to another amplifier 22 which has unity gain and also serves to invert the polarity of the applied voltage. Its output, together with the voltage $E_1$, are added and applied by means of two summing resistors 24, 26 to another summing amplifier 28 which has unity gain and serves as an isolation amplifier. The output of this amplifier therefore is $E_1$—$E_2$, or the difference of the two voltages.

The output of the amplifier 18 is connected to one 30 of a pair of opposed, spaced, parallel conductors which may be in the form of capacitive plates 30, 32 and to a central conductor or capacitive plate 34 which is intermediate the pair of plates 30, 32 and is connected to ground. The output of the difference amplifier 28 is connected to the other 32 of the pair of capacitive plates and to the intermediate plate 34. The pair of plates 30, 32 are fixed and immovable, the intermediate plate 34 is suspended from two points in a manner well-known in the instrument art, to be movable only in a direction normal to the plane of the plate. At one side of the movable plate and extending so that it is not obscured by a pair of plates, is a small mirror 36 which is mounted on the plate to be movable therewith.

A magnet 38, of which the drawing shows a fragmentary side view of the pole pieces, applies a transverse magnetic field to the movable plate 34. The magnet 38 may be a permanent one or an electromagnet excited from a constant source of potential. A light source 40 has a focusing lens 42 which focuses the light on the mirror. This light is reflected by the mirror through another lens 44 onto a grating 46. On the other side of the grating 46 are positioned two photocells 48, 50. The source of B+ for the photocells is omitted, to simplify the drawings, being applied in a fashion well known in the art. The grating 46 is so positioned, with reference to the photocells 48, 50 and the light reflected by the mirror 36 when the movable plate is at its central position, that a grating pattern is formed which falls uniformly on each photocell. Therefore each photocell receives the same amount of light and the output from each one is equal. When the movable plate is moved, the angle at which the reflected light strikes the diffraction grating is shifted, the grating pattern is then altered so that the photocell outputs are unequal. The photocell outputs are respectively applied in opposition across two resistors 52, 54 which are connected to the input of an amplifier 56. Therefore, when the movable plate is in its central position, no resultant voltage is applied to the amplifier and it has no output. When the movable plate is moved, the resultant output from the photocells 48, 50 is applied to the amplifier 56 and amplified. The amplifier output is connected in series with the movable plate 34. The greater the movable plate deflection, the larger the voltage applied to the amplifier and the larger the current which flows through the movable plate.

The polarity of the transverse field and the direction of current flow through the movable plate is such as to cause it to move, through motor action, in a direction opposite to the direction of motion caused as a result of the impressed sum and difference voltages. The gain of the amplifier 56 is made a maximum, the higher the gain, the more accurate the results obtained. The amplifier is of the type which provides an output the polarity of which is determined by the polarity of the input.

Figure 2:
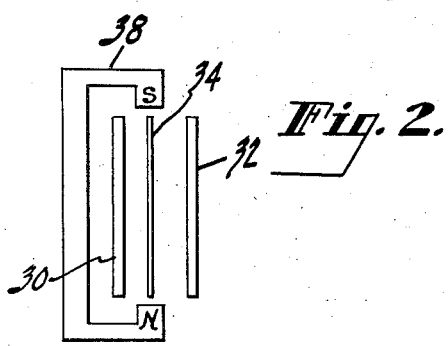
Fig. 2 is a view in elevation of the plate and magnet assembly shown in Fig. 1.

Fig. 2 is a view in elevation of the plate and magnet portion of Fig. 1. It shows the disposition of the magnet 38 with reference to the three plates 30, 32, 34. The flow of current in the movable plate is into the plane of the paper.

It can be readily shown, that the force of attraction between two plates, to which a voltage has been applied, may be represented as $$f = \frac{K}{d^2} V^2$$

where $f$ = the force of attraction between plates,
$K$ = a constant involving constant factors such as the plate areas and the dielectric material between the plates,
$d$ = the distance between the plates and
$V$ = the voltage applied to the plates.

In the case where the sum voltages are applied, the equation is $$f_1 = \frac{K_1}{(d_1)^2}(E_1+E_2)^2$$

For the difference voltages, the equation is $$f_2 = \frac{K_2}{(d_2)^2}(E_1+E_2)^2$$

Since $f_1$ and $f_2$ are applied to the movable plate in opposite directions, the resultant force, which causes the movable plate to move, is their difference. If $$\frac{K_1}{(d_1)^2}$$

is made equal to $$\frac{K_2}{(d_2)^2}$$

then the net force acting on the movable plate is $$f_n = K_n E_1 E_2$$

where $$K_n = 4\frac{K_1}{(d_1)^2} \text{ or } 4\frac{K_2}{(d_2)^2}$$

A measurement of the restoring force, or force required to neutralize $f_n$, thus provides a result which is proportional to the applied voltages. In the embodiment of the invention described, the motor action of the current flowing through the movable plate, which is in a transverse magnetic field, is used to neutralize the force $f_n$. The motion detecting system forces a current I to flow through the plate having a magnitude such that the force due to the interaction of "I" and the magnetic field "H" will just equal the net electrostatic force applied to the movable plate. If the gain of the amplifier is infinite, there will be no net motion. The net motion and error increase as the amplifier gain decreases. Since the effect of the current I and field intensity H is equal to the net force $f_n$, this relationship may be expressed as $$K_b I H = K_n E_1 E_2$$

$$I = C\frac{E_1 E_2}{H}$$

where $$C = \frac{K_n}{K_b}$$

Since the magnetic field intensity H is made a constant, the current I is proportional to the product $E_1E_2$ and the utilization device 58 may be connected to the output of the amplifier to utilize its output for any desired purpose. The polarity of the current I indicates whether the product is positive or negative.

The summing type amplifiers 28, 18 previously were indicated as having unity gain. Their gain may be other than unity providing the product of the gain and the sum of the applied voltages equals the product of the gain and the difference of the applied voltages. The embodiment of this invention may be used to obtain the product of alternating current voltages if they are rectified before being applied to the input terminals.

From the foregoing description it will be readily apparent that I have provided an improved system or apparatus for obtaining the product of two voltages. Although a single embodiment has been shown and described it should be apparent that many changes may be made in the disclosed embodiment which are within the spirit and scope of the invention. It is therefore desired that the foregoing description be taken as illustrative and not as limiting.

What is claimed is:

1. A system for obtaining the product of two voltages comprising a pair of opposed, parallel, spaced, fixed conductors, a movable parallel conductor positioned intermediate and coplanar with said pair of conductors, means to impress the sum of said two voltages upon one of said pair of conductors and said movable conductor, means to impress the difference of said two voltages upon the other of said pair of conductors and said movable conductor, means to detect motion of said movable conductor effected by said sum and difference voltages, and means controlled by said detecting means to apply a force to said movable conductor having an amplitude sufficient to oppose motion effected by said impressed sum and difference voltages, the amplitude of said force being proportional to the product of said two voltages.

2. A system for obtaining the product of two voltages as recited in claim 1 wherein said pair of spaced, fixed conductors consist of a pair of fixed capacitive plates, and said movable conductor is a movable capacitive plate.

3. A system for obtaining the product of two voltages comprising a pair of opposed, spaced, parallel fixed plates, a parallel movable plate positioned intermediate said pair of plates, means to impress the sum of said two voltages on one of said pair of plates and said movable plate, means to impress the difference of said two voltages on the other of said pair of plates and said movable plate, means to detect motion of said movable plate effected by said sum and difference voltages, and means to apply a restoring force to said movable plate responsive to said motion detecting means, the amplitude of said force being proportional to the product of said two voltages.

4. A system for obtaining the product of two voltages comprising a pair of spaced, opposed, parallel, fixed plates, a parallel movable plate positioned intermediate said pair of plates, means to impress the sum of said two voltages upon one of said pair of plates and said movable plate, means to impress the difference of said two voltages upon the other of said pair of plates and said movable plate, means to apply a transverse magnetic field to said movable plate, means to detect motion of said movable plate effected by said impressed sum and difference voltages, means to generate a current responsive to said motion detecting means, and means to apply said current to said movable plate to restore said movable plate to said intermediate position whereby said current is proportional to the product of said two voltages.

5. A system for obtaining the product of two voltages as recited in claim 4 wherein said means to detect motion of said movable plate comprises a mirror mounted on said movable plate to be movable therewith, a focussed light source which is focussed upon said mirror, a grating, means to focus light reflected by said mirror upon one side of said grating, and a photocell on the other side of said grating to receive a fringe pattern therefrom, motion of said movable plate causing a shift in said fringe pattern to vary the photocell output accordingly.

6. A system for obtaining the product of two voltages comprising means to obtain the sum of said two voltages, means to obtain the difference of said two voltages, a pair of spaced, opposed, parallel, fixed plates, a parallel movable plate positioned intermediate said pair of fixed plates, means to impress said sum voltage upon one of said pair of plates and said movable plate, means to impress said difference voltage upon the other of said pair of plates and said movable plate, means to apply a transverse magnetic field to said movable plate, a mirror mounted on said movable plate to be movable therewith, a focussed light source which is focussed upon said mirror, a grating, means to focus light reflected by said mirror upon one side of said grating, a pair of photocells having oppositely connected outputs positioned on the other side of said grating to receive equally a fringe pattern therefrom when said movable plate is centrally positioned, motion of said movable plate from said central position causing a shift in said fringe pattern to vary the output from said photocells accordingly, means to generate a current responsive to said output, and means to apply said current to said movable plate to oppose motion of said movable plate resulting from said impressed sum and difference voltages.

No references cited.